(12) United States Patent
Hazra et al.

(10) Patent No.: US 12,500,544 B2
(45) Date of Patent: Dec. 16, 2025

(54) DATA-ANALYSIS-BASED CONTROL OF FLOATING SOLAR ARRAY LOCATION

(71) Applicant: INTERNATIONAL BUSINESS MACHINES CORPORATION, Armonk, NY (US)

(72) Inventors: Jagabondhu Hazra, Bangalore (IN); Manikandan Padmanaban, Chennai (IN); Sarbajit K. Rakshit, Kolkata (IN); Marc Henri Coq, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 18/314,306

(22) Filed: May 9, 2023

(65) Prior Publication Data

US 2024/0380355 A1 Nov. 14, 2024

(51) Int. Cl.
*H02S 10/40* (2014.01)
*B63B 79/20* (2020.01)
(Continued)

(52) U.S. Cl.
CPC .............. *H02S 10/40* (2014.12); *B63B 79/20* (2020.01); *B63B 79/40* (2020.01); *G05D 1/0206* (2013.01); *B63B 2035/4453* (2013.01)

(58) Field of Classification Search
CPC ......... H02S 10/40; H02S 50/00; B63B 79/20; B63B 79/40; B63B 2035/4453;
(Continued)

(56) References Cited

U.S. PATENT DOCUMENTS

| 4,278,829 A | 7/1981 | Powell |
| 4,316,448 A | 2/1982 | Dodge |

(Continued)

FOREIGN PATENT DOCUMENTS

| CN | 102185521 A | 9/2011 |
| CN | 217135210 U | 8/2022 |

(Continued)

OTHER PUBLICATIONS

English machine translation of KR-101918120-B1 (Year: 2018).*

(Continued)

*Primary Examiner* — Angelo Trivisonno
(74) *Attorney, Agent, or Firm* — Michael A. Petrocelli, Esq.; Kevin P. Radigan, Esq.; Heslin Rothenberg Farley & Mesiti P.C.

(57) ABSTRACT

A data-analysis-based process of controlling a floating solar array location is provided. The process includes providing data analysis-based control of location of the floating solar array on water within a geographical area. The floating solar array has a propulsion system coupled to the floating solar array to facilitate relocating of the floating solar array. The control is configured to identify, using one or more machine learning prediction models, a region of a plurality of regions of the geographical area which meets, for a forecasted time period, a predefined criteria for harvesting energy from the floating solar array. Further, the control is configured to initiate, using the propulsion system, dynamic relocating of the floating solar array to the identified region of the geographical area to facilitate solar energy harvesting from the floating solar array for the forecasted time period.

17 Claims, 13 Drawing Sheets

(51) Int. Cl.
  *B63B 79/40* (2020.01)
  *G05D 1/00* (2006.01)
  *B63B 35/44* (2006.01)

(58) Field of Classification Search
  CPC ............. G05D 1/0206; G05D 2105/57; G05D 2107/27; G05D 2109/34; G05D 1/249; G05D 1/6445
  USPC ........................................................ 136/251
  See application file for complete search history.

(56) References Cited

U.S. PATENT DOCUMENTS

| | | | |
|---|---|---|---|
| 5,449,413 | A | 9/1995 | Beauchamp et al. |
| 8,242,621 | B1 | 8/2012 | Tate et al. |
| 10,141,885 | B2 | 11/2018 | Smadja et al. |
| 2010/0198420 | A1 | 8/2010 | Rettger et al. |
| 2010/0307566 | A1 | 12/2010 | Hinderling |
| 2016/0087573 | A1 | 3/2016 | Yang et al. |
| 2016/0320787 | A1 | 11/2016 | Carlson |
| 2018/0248509 | A1* | 8/2018 | Dayama ............... H02S 20/32 |
| 2019/0181793 | A1* | 6/2019 | Azad ................. H02S 10/00 |
| 2020/0011731 | A1* | 1/2020 | Siddiqui ............. H02J 3/004 |
| 2020/0099336 | A1 | 3/2020 | Monforte et al. |

FOREIGN PATENT DOCUMENTS

| | | | | |
|---|---|---|---|---|
| JP | 2007-184354 | A | 7/2007 | |
| KR | 100999934 | B1 | 12/2010 | |
| KR | 20150051352 | A | 5/2015 | |
| KR | 2018-0057054 | A | 5/2018 | |
| KR | 101918120 | B1 * | 11/2018 | ............. H02S 10/40 |
| TW | 1545887 | B | 8/2016 | |
| WO | WO 2009/079261 | A2 | 6/2009 | |
| WO | WO 2016/053215 | A1 | 4/2016 | |
| WO | WO-2017023536 | A1 * | 2/2017 | ............. F24S 20/70 |
| WO | 2024/231733 | A1 | 11/2024 | |

OTHER PUBLICATIONS

English machine translation of KR20180057054A (Year: 2018).*
Anonymous, "Tracking Algorithm for Optimal Photovoltaic (PV) Efficiency Under Diffused Light", IP.com No. IPCOM000195517D, published May 4, 2010 (6 pages) (Year: 2010).
Bakar et al., "Technoeconomic Analysis of Floating Solar Field for 1 GWh of Electricity Generation", IOP Conference Series: Materials Science and Engineering, 495 (2019) 012064 (18 pages) (Year: 2019).
Eco Boats Australia, "Is Electric Propulsion Suitable for My Boat?", Eco Boats Australia, https://ecoboats.com.au/is-electric-propulsion-suitable-for-my-boat/ (10 pages) (retrieved/downloaded Apr. 10, 2023).
Lagos et al., "Meso-Scale Spatial Variation in Settlement and Recruitment of Intertidal Barnacles Along the Coast of Central Chile", Marine Ecology Progress Series, vol. 290, pp. 165-178, Apr. 13, 2005 (Year: 2005).
Martins et al., "Systematic Review of Nowcasting Approaches for Solar Energy Production Based Upon Ground-Based Cloud Imaging", Solar Energy Advances, 2 (2022) 100019 (15 pages) (Year: 2022).
Nevon Projects, "Foating Sun Tracker Hydraulic Solar Panel", Nevon Projects, https://nevonprojects.com/floating-sun-tracker-hydraulic-solar-panel/ (8 pages) (retrieved/downloaded Apr. 10, 2023).
Neilsen et al., "CloudCast: A Satellite-Based Dataset and Baseline for Forecasting Clouds", IEEE, DOI: 10.1109/JSTARS.2021.3062936, published Jun. 16, 2021 (10 pages) (Year: 2021).
Otokunefor et al., "The Effect of Cloud on the Output Performance of a Solar Module", International Journal of Engineering Science and Computing (IJESC), vol. 9, No. 2, Feb. 2019 (pp. 19665-19671) (Year: 2019).
Penteliuc, Marius E., "Cloud Dynamics: The State of Art", Dept. of Computer Science, Romania, published Nov. 23, 2020 (53 pages) (Year: 2020).
Royal Belgian Institute for Marine Engineers, "Wind and Wave Affect Fuel Consumption", Marin, Aug. 2008 (2 pages) (Year: 2008).
Science Daily, "Solar Power Plants Get Help from Satellites to Predict Cloud Cover", American Institute of Physics, https://www.sciencedaily.com/releases/2020/04/200414122754.htm>, published Apr. 14, 2020 (1 page) (Year: 2020).
Yeom et al., "Thin Cloud Detection Over Land Using Background Surface Reflectance Based on the BRDF Model Applied to Geostationary Ocean Color Imager (GOCI) Satellite Data Sets", Remote Sensing of Environment, 239 (2020) 111610, published Dec. 28, 2019 (13 pages) (Year: 2020).
International Search Report for PCT Application No. PCT/IB2024/051155 mailed Sep. 4, 2024. 6 pages.

* cited by examiner

Optimization framework

Given the N grid spatial regions, the optimal region 'j' is selected such that the maximum energy can be harvested from the floating solar array by
- ✓ maximize the irradiance harvest by choosing the least cloud impacted or higher irradiance spatial region
- ✓ minimize the energy lost in moving the floating solar array $$J = Max. \sum_{j=1}^{N} u_j \{\underbrace{w_L . E_L(L_j - L_c^*)}_{\text{Additional energy generation}} - \underbrace{w_D . E_T(Dist(j,c), speed(j,c), f_{j,c})}_{\text{Energy lost in moving the array}}\} - \underbrace{w_{temp} . E_{temp}(j_{Temp}, c_{temp})}_{\text{Energy lost due to temperature difference}}$$

subject to $\sum_{i=1}^{N} u_j \leq 1$; $0 \leq time(j,c) \leq t^{max}$;

$0 \leq Dist(j,c) \leq D^{max}$; $0 \leq speed(j,c) \leq speed^{max}$;

$time(j,c) \propto (Dist(j,c) / speed(j,c)$; $j(x,y)^{min} \leq j(x,y) \leq j(x,y)^{max}$;

$J$ - cost function (energy gain)
$u_j$ - Binary decision variable (optimal spatial region 'j')
$L_j$ - available irradiance for the spatial region 'j' for the forecasted time horizon
$L_c^*$ - Irradiance at the current location 'c' for the forecasted time horizon
$E_L$ - Energy production from floating solar array as a function of irradiance 'L'
$E_T$ - Energy lost (water jet + anchor retrieval) in moving the floating solar array
$E_{temp}$ - Energy lost due to temperature difference in moving the floating solar array from 'c' to 'j'
$Dist(j,c)$ – distance between the region 'j' and the current location 'c'
$Speed(j,c)$ - speed between the region 'j' and the current location 'c'
$time (j,c)$ - travel time between the region 'j' and the current location 'c'
$w_L, w_D, w_{temp}$ - weighing coefficient for energy generated from region and energy lost in moving respectively
$j(x,y)$ - region 'j' with x and y co-ordinates
$D^{max}, t^{max}, speed^{max}, j(x,y)^{max}$ - Maximum limit for distance, time, speed and co-ordinates
$f_{j,c}$ - factor to account for heavy tides/currents (1 – when going towards currents & ~1.05 for against the currents)

FIG. 6

DATA-ANALYSIS-BASED CONTROL OF FLOATING SOLAR ARRAY LOCATION

BACKGROUND

This invention relates generally to facilitating energy harvesting, and in particular, to data-analysis-based control of a floating solar array location to facilitate energy harvesting from the floating solar array over a forecasted time interval.

The energy sector accounts for a significant portion of total greenhouse gas emissions globally. Many countries are aligning their support towards clean energy, including solar energy generation. With increasing focus on renewable, sustainable and clean energy, energy systems are expected to continue undergoing transformations to meet the growing demands for clean energy. For example, floating solar array energy generation is expected to undergo significant growth over the coming years.

A solar array, or solar cell array, can include one or more solar cell panels, or photovoltaic panels, which are an assembly of photovoltaic solar cells that capture sunlight as a source of radiant energy that is converted into electricity in the form of direct current (DC) electricity. Solar cells can be made of a variety of technologies. For instance, solar cells can be made of crystalline silicon wafers, or be based on thin-film silicon technologies. In other implementations, solar cells can be based on amorphous silicon. Other solar cell technologies are also possible in the art. Solar cell arrays are used in a variety of applications.

SUMMARY

Certain shortcomings of the prior art are overcome, and additional advantages are provided herein through the provision of a computer-implemented method of facilitating solar energy harvesting. The computer-implemented method includes providing data analysis-based control of location of a floating solar array on water within a geographical area. The floating solar array has a propulsion system coupled thereto to facilitate relocating of the floating solar array. The control is configured to identify, using one or more machine learning prediction models, a region of a plurality of regions of the geographical area which meets, for a forecasted time period, a predefined criteria for harvesting energy from the floating solar array. In addition, the control is configured to initiate, using the propulsion system, dynamic relocating of the floating solar array to the identified region of the geographical area to facilitate solar energy harvesting from the floating solar array for the forecasted time period.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 6 depicts one example of a data analysis-based control algorithm for identifying a region which meets, for a forecasted time period, a predefined criteria for harvesting energy from the floating solar array, in accordance with one or more aspects of the present invention;

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
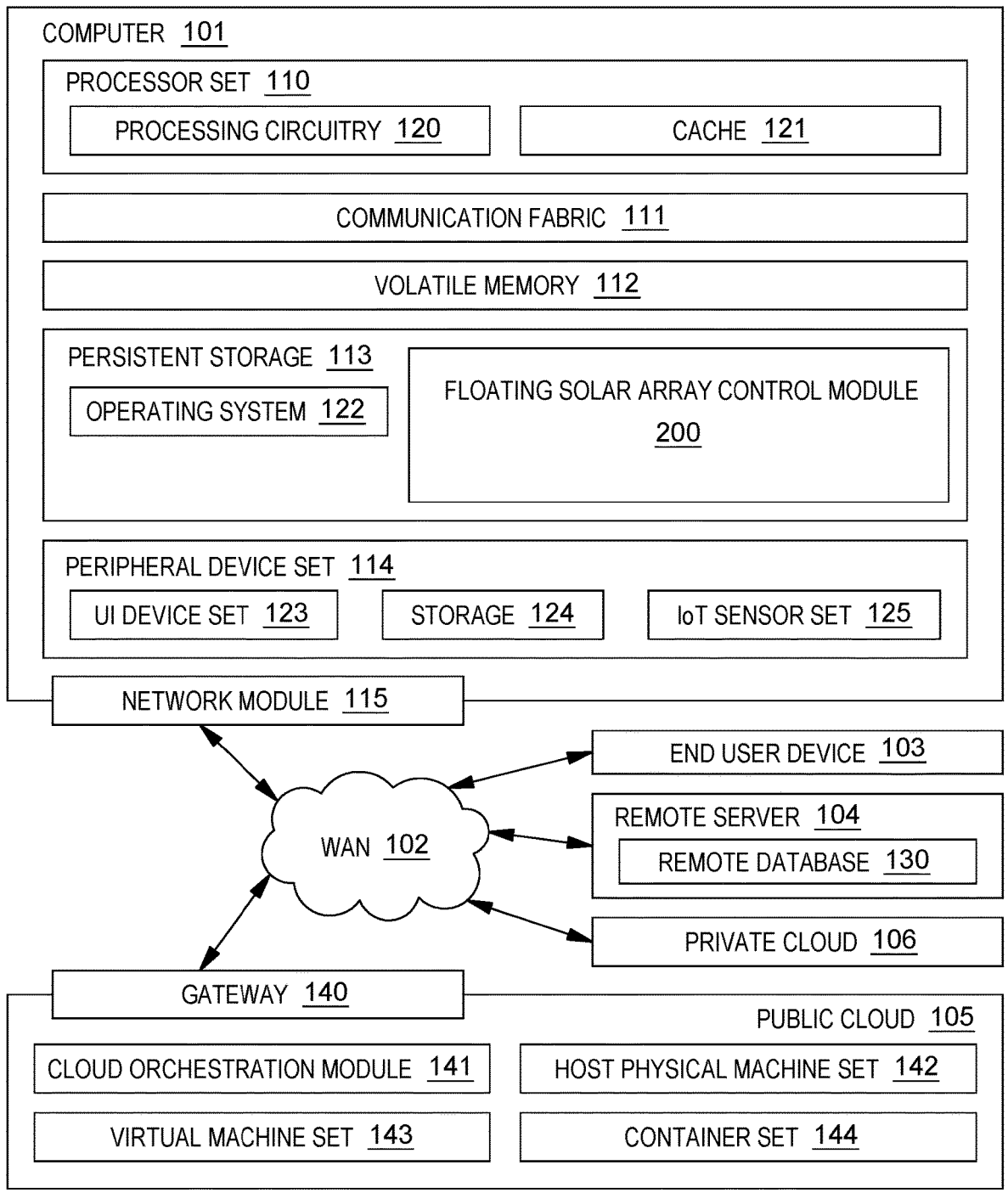
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and floating solar array control module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform floating solar array control processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as floating solar array control module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2A:
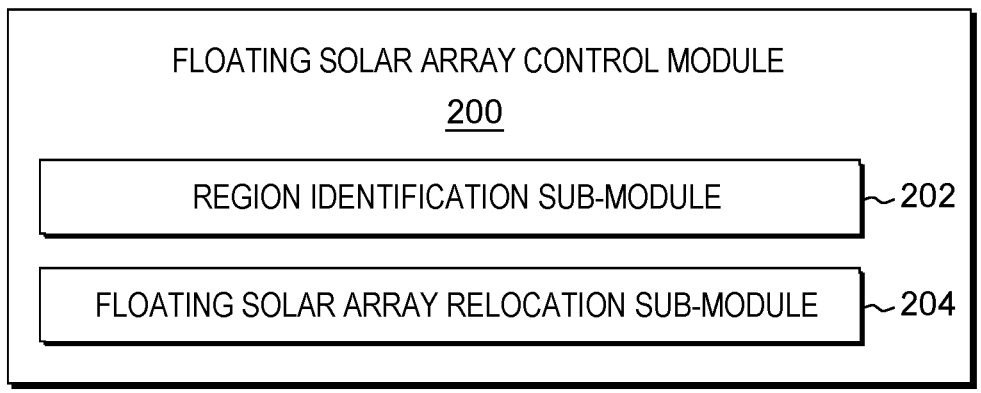
FIG. 2A depicts one embodiment of a computer program product with a floating solar array control module, in accordance with one or more aspects of the present invention.
Figure 2B:
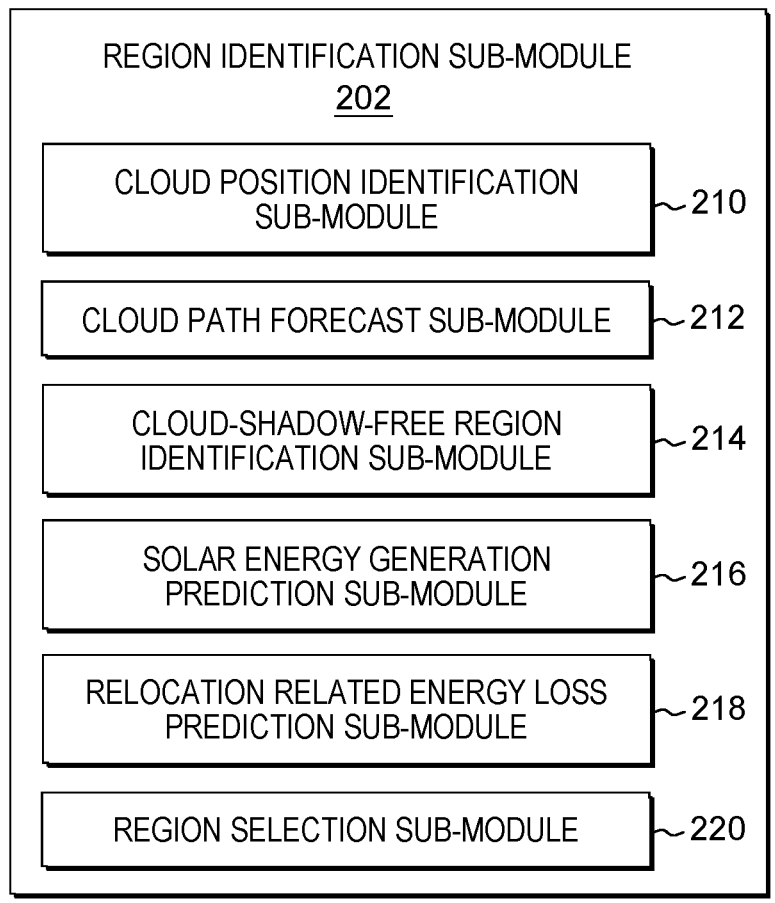
FIG. 2B depicts one embodiment of a computer program product with a region identification sub-module, in accordance with one or more aspects of the present invention.
Figure 3A:
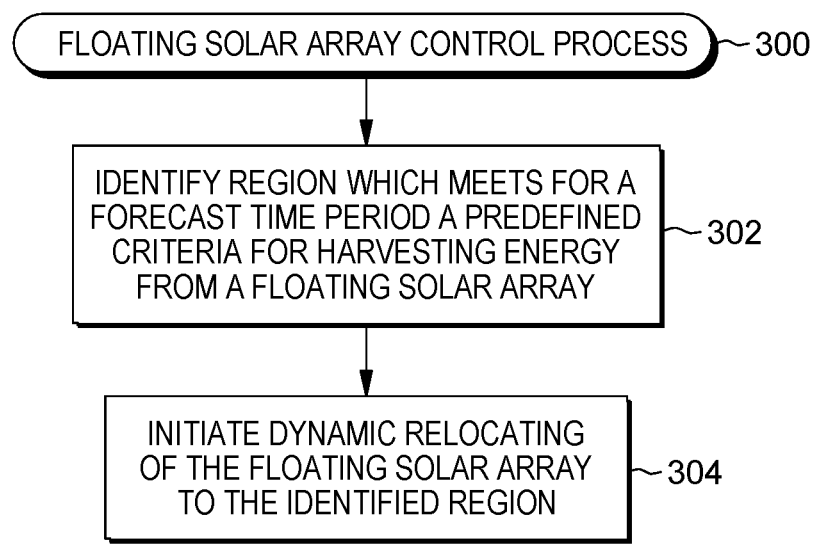
FIG. 3A depicts one embodiment of a floating solar array control workflow, in accordance with one or more aspects of the present invention.
Figure 3B:
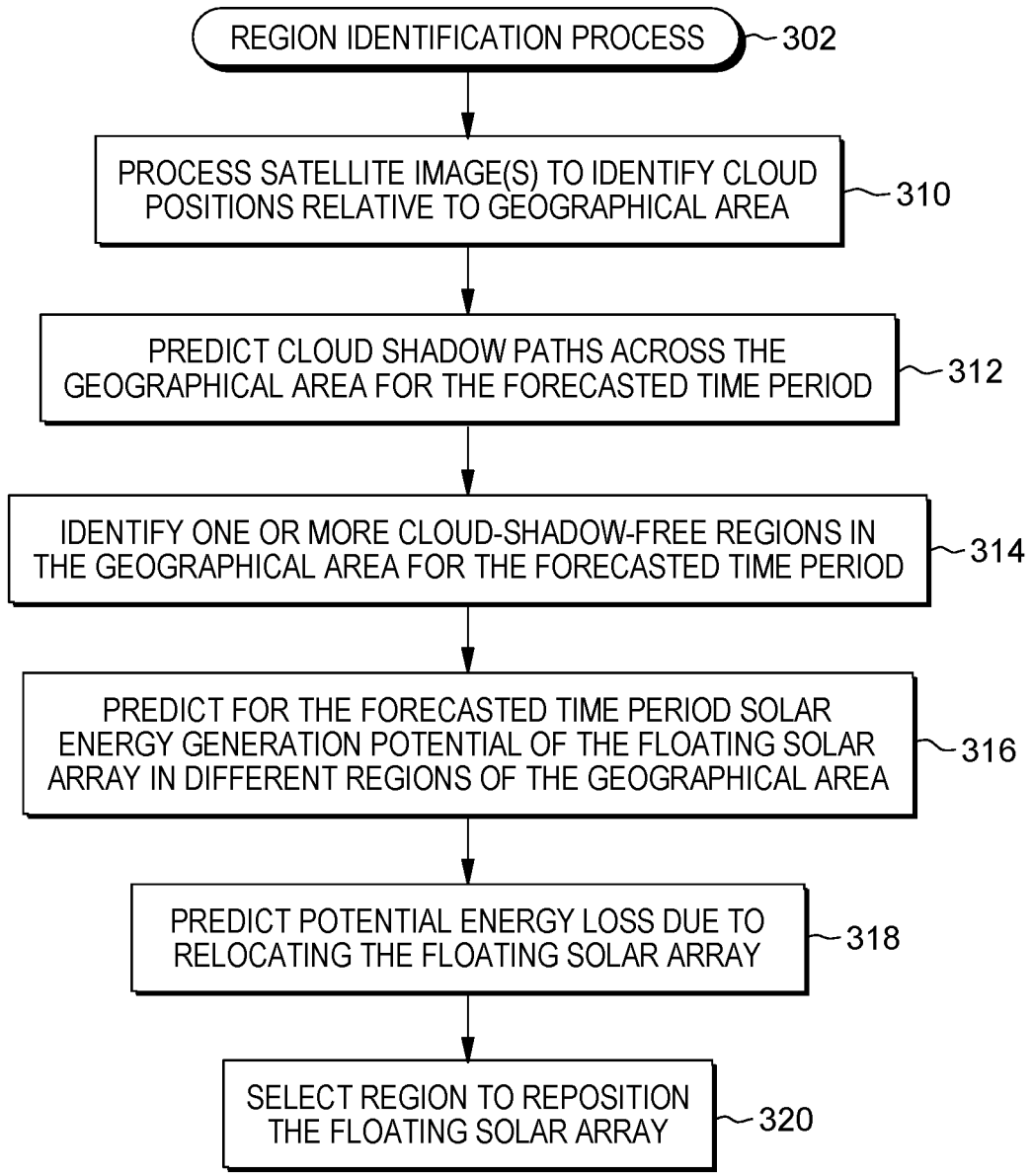
FIG. 3B depicts one embodiment of a region identification workflow, in accordance with one or more aspects of the present invention.

By way of example, one or more embodiments of a floating solar array control module and process are described initially with reference to FIGS. 2A-3B. FIGS. 2A-2B depict one embodiment of floating solar array control module 200 that includes code or instructions to perform floating solar array control processing, in accordance with one or more aspects of the present invention, and FIGS. 3A-3B depict one embodiment of a floating solar array control process, in accordance with one or more aspects of the present invention.

Referring to FIGS. 1-2A, floating solar array control module 200 includes, in one example, various sub-modules used to perform processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

As noted, FIG. 2A depicts one embodiment of a floating solar array control module 200 which, in one or more embodiments, provides data-analysis-based control of location of a floating solar cell array on water within a geographical area. The floating solar array includes a propulsion system coupled to the floating solar array to facilitate relocating of the floating solar array, pursuant to the data-analysis-based control. In the FIG. 2A embodiment, example sub-modules of floating solar array control module 200 include a region identification sub-module 202 which identifies, using one or more machine learning prediction models, a region of a plurality of regions of the geographical area which meets, for a forecasted time period, a predefined criteria for harvesting energy from the floating solar array; and a floating solar array relocation sub-module 204 which initiates, using the propulsion system, dynamic relocating of the floating solar array to the identified region of the geographical area to facilitate solar energy harvesting from the floating solar array for the forecasted time period. Advantageously, using floating solar array control such as disclosed herein facilitates, in one or more embodiments, solar energy harvesting by identifying and relocating the floating solar array to a region of the geographical area with, for instance, optimal net irradiance harvesting potential over the forecasted time period. The data-analysis-based control is configured, in one embodiment, to dynamically change location of the floating solar array to capture additional solar energy over the forecasted time period. The data-analysis-based control can optimize, in one or more embodiments, the trade-off between expending energy in relocating the floating solar array within a geographical area, versus potential extra energy that can be generated resulting from moving the solar panel array to a different region of the geographical area. Note that although various sub-modules are described, floating solar array control module processing such as disclosed herein can use, or include, additional, fewer, and/or different sub-modules. A particular sub-module can include additional code, including code of other sub-modules, or less code. Further, additional and/or other modules can be used. Many variations are possible.

By way of further example, FIG. 2B depicts one embodiment of region identification sub-module 202, which includes (in one or more embodiments) a cloud position identification sub-module 210 to, for instance, facilitate data-analysis-based evaluation of one or more satellite images to obtain cloud positions relative to the geographical area, including cloud-shadow coverage of the geographical area; a cloud forecast sub-module 212 to, for instance, predict cloud-shadow paths across the geographical area for the forecasted time period to facilitate identifying one or more predicted cloud-shadow-free regions of the geographical area for the forecasted time period; a cloud-shadow-free region identification sub-module 214 to identify, based on data analysis, one or more predicted cloud-shadow-free regions of the plurality of regions of the geographical area for the forecasted time period; a solar energy generation prediction sub-module 216 to predict, using one or more machine learning prediction models, potential solar energy generation of the floating solar array within, for instance, one or more regions of the geographical area, over the forecasted time period; a relocation-related energy loss prediction sub-module 218 to predict, using one or more machine learning prediction models, anticipated energy loss to relocate the floating solar array from a current region (or location) to one or more different regions of the geographical area for the forecasted time period; and a region selection sub-module 220 to select, or identify, a particular region of the geographical area which best meets, for the forecasted time period, the predefined criteria for harvesting energy from the floating solar array. In one or more embodiments, the predefined criteria can include, for the forecasted time period, an optimal (or greatest) net energy harvesting potential for the floating solar array compared with potential net energy harvesting from one or more other regions of the plurality of regions of the geographical area for the forecasted time period.

In one or more embodiments, the sub-modules are used, in accordance with one or more aspects of the present invention, to perform floating solar array control processing. FIG. 3A depicts one example of a floating solar array control process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as floating solar array control module 200. In other examples, the code can be included in one or more other modules and/or in one or more sub-modules of the one or more other modules. Various options are available.

As one example, floating solar array control process 300 executing on a computer (e.g., computer 101 of FIG. 1), a processor (e.g., a processor of processor set 110 of FIG. 1), and/or processing circuitry (e.g., processing circuitry of processor set 110), identifies a region which meets, for a forecasted time period, a predefined criteria for harvesting energy from a floating solar array 302. In one or more embodiments, the floating solar array control process controls location of the floating solar array on water within a specified geographical area, and the floating solar array has a propulsion system associated with the array to facilitate relocating of the floating solar array pursuant to the control processing. Note in this regard, that the size of the geographical area can vary depending on the implementation.

In one or more embodiments, the floating solar array control process 300 further includes initiating, using the propulsion system, dynamic relocating of the floating solar array to the identified region 304, where the floating solar array is moved dynamically to the identified region of the geographical area to facilitate solar energy harvesting from the floating solar array for the forecasted time period. In one or more implementations, the forecasted time period can be a predefined time period (e.g., 24 hours), or a dynamically set time period depending, for instance, on weather conditions, length of daylight, etc.

By way of further example, FIG. 3B depicts further details of one embodiment of region identification process 302, which as noted, executes on a computer (e.g., computer 101 of FIG. 1), a processor (e.g., processor of processor set 110 of FIG. 1), and/or processing circuitry (e.g., processing circuitry of processor set 110), etc. As illustrated in FIG. 3B, region identification process 302 can include, in one embodiment, processing one or more satellite images to identify cloud positions relative to the geographical area 310. Note in this regard that, depending on the angle of the sun, a cloud position may not be directly over the geographical area, but still project a shadow over the geographical area, and therefore be relevant to the analysis. The region identification process 302 further includes, in one or more embodiments, predicting cloud-shadow paths across the geographical area for the forecasted time period 312, and identifying one or more cloud-shadow-free regions in the geographical area for the forecasted time period 314. Note in this regard that "cloud-shadow-free" can refer to a region of the geographical area free of any cloud-shadow for the forecasted time period, and/or a region with a minimum amount of cloud-shadowing for the forecasted time period within the geographical area.

The region identification process 302 further includes, in one or more implementations, predicting, for the forecasted time period, solar energy generation potential of the floating solar array in different regions of the geographical area 316, as well as predicting potential energy loss in relocating the floating solar array from a current region of the geographical area to another region of the geographical area 318. Based on the predicted solar energy generation potential, and the predicted potential energy loss in relocating the array, the region identification process determines whether a particular region meets, for the forecasted time period, the predefined criteria for harvesting energy from the floating solar array 320. As noted, in one or more embodiments, the predefined criteria can include, for the forecasted time period, a greatest, or optimal, net energy harvesting potential for the floating solar array, where the net energy harvesting potential takes into account any anticipated energy loss in relocating the floating solar array from a current region to the other region.

As with any solar array, cloud-shadowing over a portion or all of a floating solar array can degrade energy generation by as much as 30%-60%. Advantageously, disclosed herein are computer-implemented methods, computer systems and computer program products which provide data-analysis-based control of location of a floating solar array on water within a geographical area to facilitate solar energy harvesting from the floating solar array for a forecasted time period.

Figure 4A:
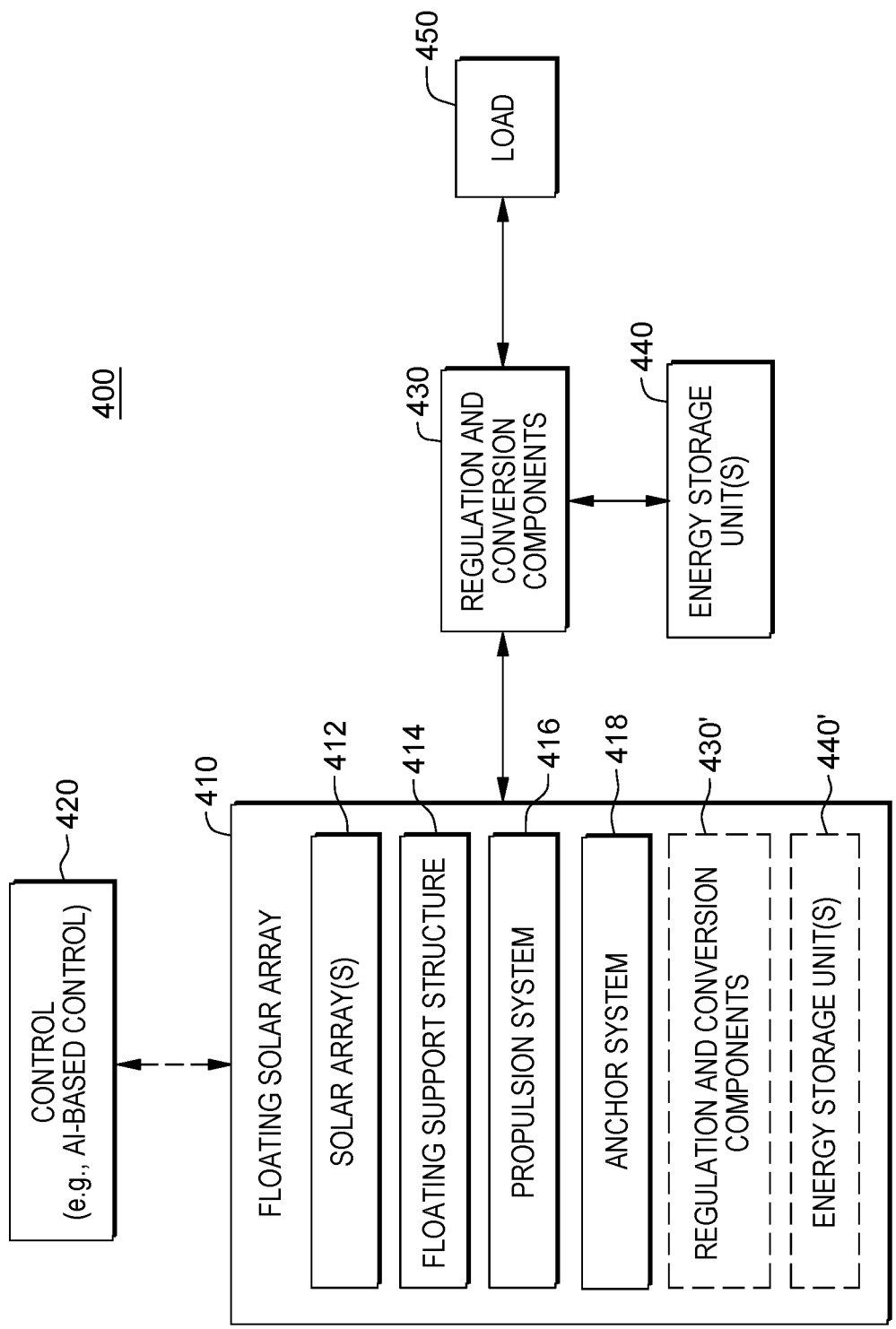
FIG. 4A depicts one embodiment of a floating solar array environment to include and/or use one or more aspects of the present invention.

One embodiment of a floating solar array, or floating photovoltaics, system environment 400 is depicted in FIG. 4A. As depicted, in one embodiment, the system environment 400 includes one or more floating solar arrays 410, each of which includes one or more solar array 412 mounted on, or supported by, a floating support structure 414, which floats on water, such as the ocean, a lake, a river, a canal, etc. By way of example, in one or more embodiments, floating supporting structure 414 can be, at least in part, a foam-based floating support structure.

As illustrated in FIG. 4A, in one or more embodiments, floating solar array 410 further includes a propulsion system 416, such as a system including multiple pump-jets or water-jets that produce jets of water for propulsion. The mechanical arrangement of such a jet system can be a ducted propeller (axial-flow pump), a centrifugal pump, or a combination of both designs. In one or more implementations, a plurality of pump jets can be arranged around the floating solar array to allow propulsion of the floating solar array in any direction to facilitate relocating of the floating solar array from one region to another region, such as disclosed herein.

A data-analysis-based control 420, such as an artificial-intelligence-based control (i.e., controller or control system) is provided in communication with floating solar array 410 to dynamically control relocating of floating solar array 410, that is, via control of propulsion system 416. Note that although data-analysis-based control 420 is shown separate from floating solar array 410, in one or more other implementations, data-analysis-based control 420 can be located on, or otherwise integrated with, floating solar array 410. As explained, in one or more embodiments, control 420 is configured to identify, using one or more machine learning prediction models, a region of a plurality of regions of a geographical area which meets, for a forecasted time period, a predefined criteria for harvesting energy from the floating solar array, and to initiate, using the propulsion system, dynamic relocating of the floating solar array to the identified region of the geographical area to facilitate solar energy harvesting from the floating solar array for the forecasted time period.

In one or more embodiments, floating solar array 410 further includes an anchor system 418, which can be an electronically-controllable anchor system, activated and deactivated by control 420 to, for instance, raise one or more anchors maintaining floating solar array 410 in position, and release (or lower) the one or more anchors once floating solar array 410 has been relocated to an identified region of the geographic area.

In one or more embodiments, floating solar array 410 further includes energy regulation and/or conversion components 430 for, for instance, regulating and converting generated DC electricity to AC electricity to, for instance, power a load 450, and/or to store generated energy in one or more energy storage units 440, such as one or more battery storage units. In one or more implementations, regulation and conversion componentry 430' and/or energy storage unit(s) 440' can also, or alternatively, be associated with, or mounted to, floating solar array 410.

In one or more embodiments, cabling, such as underwater cabling, couples the floating solar array to one or more land-based components, such as to land-based regulation and conversion components 430, energy storage unit(s) 440, and/or load 450. In one or more other implementations, regulation and conversion components 430 and/or energy storage unit(s) 440 can be positioned at a fixed location in the water, such as underwater on a sea bed, lake bed, etc., with cabling connecting to floating solar array 410. In one or more embodiments, the cabling is configured with a specified length which allows for dynamic relocating of the floating solar array on the water within a specified geographical area, such as defined, or allowed, by the cabling. For instance, in one or more embodiments, the cabling can allow for relocating of the floating solar array for a mile or two, or more, in one or more directions. Note that this is one example only. The geographical area within which the floating solar array can be relocated can be application dependent, and depend, in one or more embodiments, on other considerations than cabling length. For instance, the configuration of a lake or river can define the geographical area within which the floating solar array can be moved.

Figure 4B:
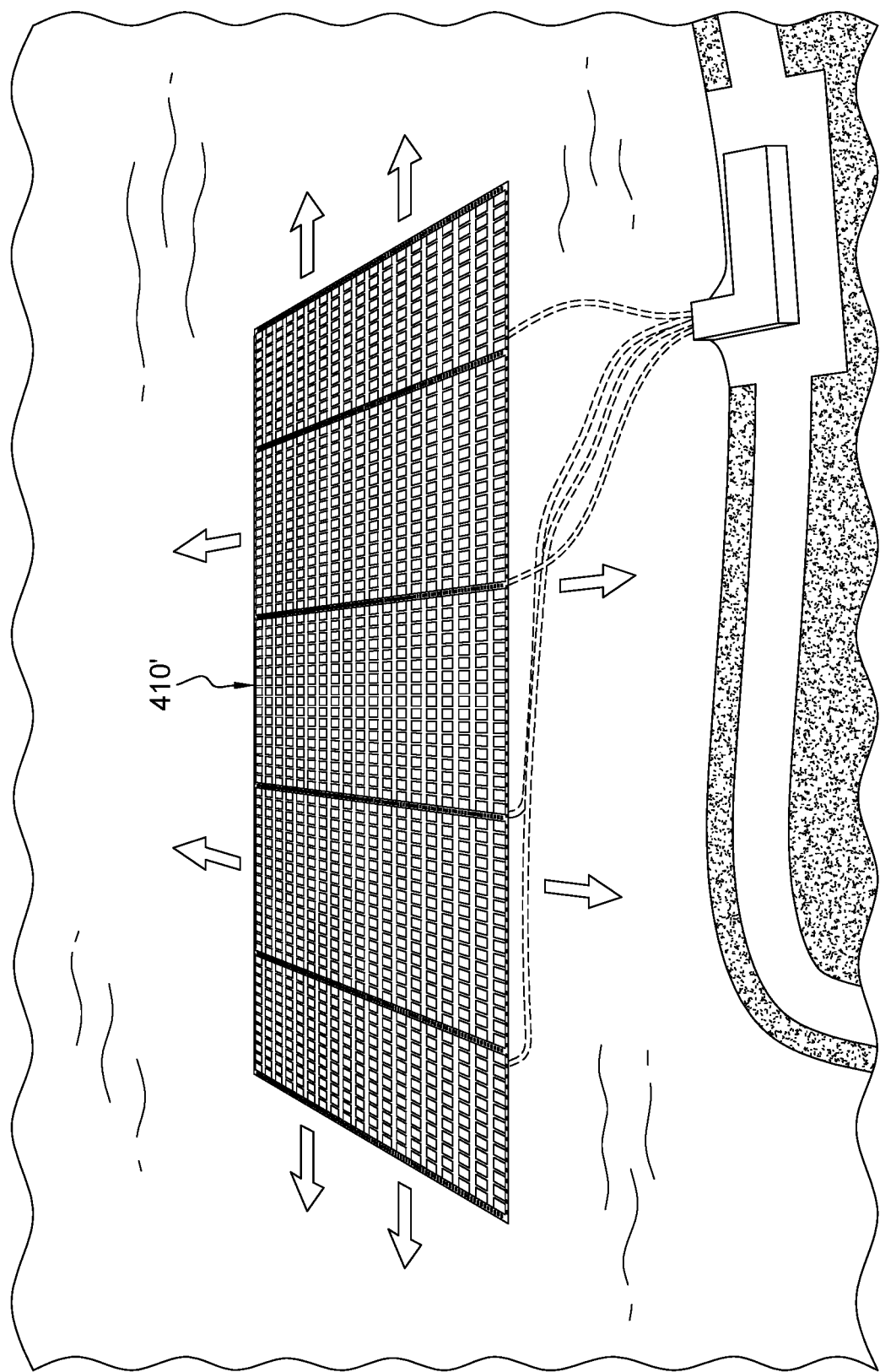
FIGS. 4B-4C depict different embodiments of a floating solar array to be controlled, in accordance with one or more aspects of the present invention.
Figure 4C:
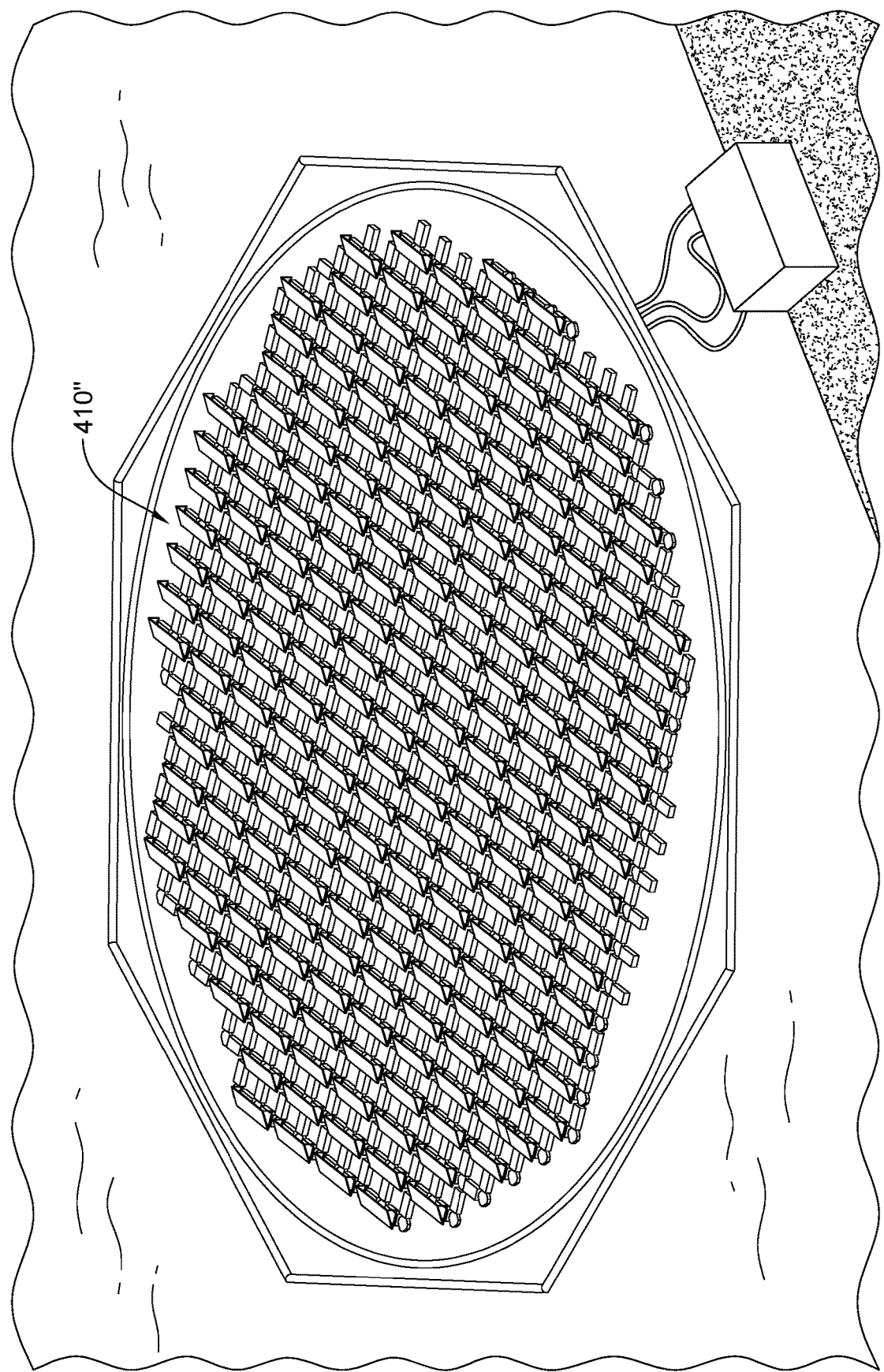

FIGS. 4B-4C depict different embodiments of a floating solar array 410', 410", similar to floating solar array 410 of FIG. 4A, which can be relocated pursuant to data-analysis-based control, such as described herein. In FIG. 4B, floating solar array 410' includes, by way of example, one or more solar panels of fixed position, such as solar panels arrayed in a planar array. In FIG. 4C, floating solar array 410" includes repositionable solar panels in the solar array which are moveable to, for instance, turn or pivot to track movement of the sun across a particular location. Many solar array variations are possible for a floating solar array, such as described herein.

Figure 5A:
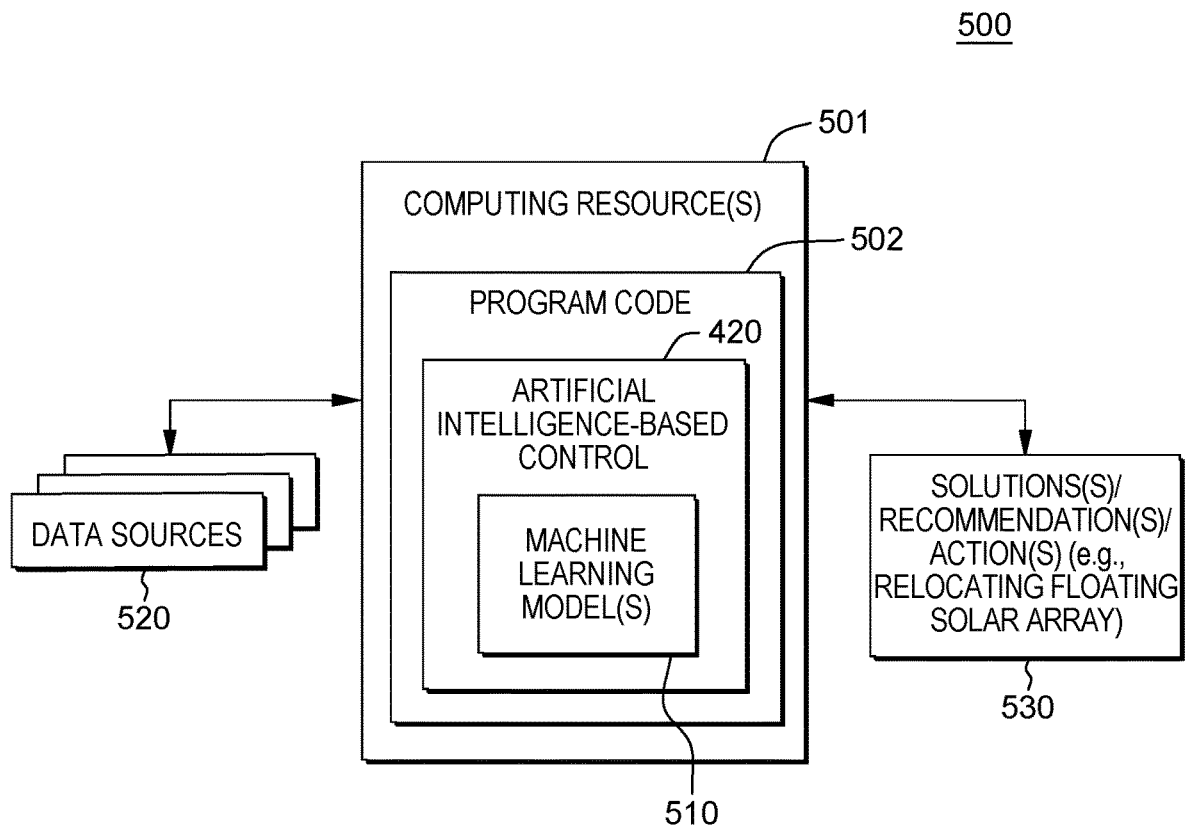
FIG. 5A is a further example of a computing environment to include and/or use one or more aspects of the present invention.

By way of further explanation, FIG. 5A depicts another embodiment of a computing environment or system 500, which can incorporate, or implement, one or more aspects of an embodiment of the present invention. In one or more implementations, system 500 is implemented as part of a computing environment, such as computing environment 100 described above in connection with FIG. 1. System 500 includes one or more computing resources 501 that execute program code 502 that implements, for instance, one or more aspects of a module or facility such as disclosed herein, and which includes an artificial-intelligence-based control 420 (FIG. 4A), which utilizes one or more machine learning models 510, such as described herein. Data, such as satellite imagery, global positioning system (GPS) data for the floating solar array, weather data, including wind velocity and wind direction, solar irradiance data, sun angle data, propulsion system energy consumption data, anchor system consumption data, water temperature data, and/or other data associated with generating one or more machine learning prediction models to be used in accordance with one or more aspects disclosed herein, is used by a cognitive engine or agent to train machine learning model(s) 510 to (for instance) identify a region of a plurality of regions of the geographical area which meets, for a forecasted time period, a predefined criteria for harvesting energy from the floating solar array, and to initiate, using the propulsion system, dynamic relocating of the floating solar array to the identified region of the geographical area to facilitate solar energy harvesting from the floating solar array for the forecasted time period, and/or other related solutions/recommendations/actions 530, based on the particular application of the machine learning model(s). In one implementation, system 500 can include, or utilize, one or more networks for interfacing various aspects of computing resource(s) 501, as well as one or more data sources 520 providing data, and one or more components, systems, etc., receiving an output, action, etc., 530 of machine learning model(s) 510 to facilitate performance of one or more artificial intelligence system operations. By way of example, the network(s) can be, for instance, a telecommunications network, a local-area network (LAN), a wide-area network (WAN), such as the Internet, or a combination thereof, and can include wired, wireless, fiber-optic connections, etc., operatively coupling the computing resource(s) 501 to the floating solar array and to other data sources. The network(s) can include one or more wired and/or wireless networks that are capable of receiving and transmitting data, including training data for the machine-learning model, and an output solution, recommendation, action, of the machine-learning model(s), such as discussed herein.

In one or more implementations, computing resource(s) 501 house and/or execute program code 502 configured to perform methods in accordance with one or more aspects of the present invention. By way of example, computing resource(s) 501 can be a computing-system-implemented resource(s). Further, for illustrative purposes only, computing resource(s) 501 in FIG. 5A is depicted as being a single computing resource. This is a non-limiting example of an implementation. In one or more other implementations, computing resource(s) 501 can, at least in part, be multiple separate computing resources or systems, such as one or more computing resources of a cloud-hosting environment, by way of example only.

Briefly described, in one embodiment, computing resource(s) 501 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed are described further herein with reference to the figures.

In one embodiment, program code 502 executes a cognitive control or agent 420 which includes (and optionally trains) one or more models 510. The models can be trained using training data that can include a variety of types of data, depending on the model and the data sources. In one or more embodiments, program code 502 executing on one or more computing resources 501 applies one or more algorithms of cognitive control 420 to generate and train the model(s), which the program code then utilizes to, for instance, identify a region of a plurality of regions of the geographical area which meets, for a forecasted time period, predefined criteria for harvesting energy from the floating solar array, including, for instance, identifying a region with a greatest net energy harvesting potential for the floating solar array, and depending on the implementation, to automatically perform an action, such as initiating dynamic relocating of the floating solar array to the identified region of the geographical area to facilitate solar energy harvesting from the floating solar array for the forecasted time period. In an initialization or learning stage, program code 502 trains one or more machine learning models 510 using obtained training data that can include, in one or more embodiments, one or more data source inputs, including solar array energy generation data, satellite imagery data, weather data, propulsion system data, anchor system data, water temperature data, etc., such as described herein.

Data used to train the models, in one or more embodiments of the present invention, can include a variety of types of data, such as heterogeneous data generated by multiple data sources and/or data stored in one or more databases accessible by, the computing resource(s). Program code, in embodiments of the present invention, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h (x), also referred to as a hypothesis, which the program code utilizes as a model. In identifying machine learning model(s) 510, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present invention, the program code can utilize one or more neural networks to analyze training data and/or collected data to generate an operational machine-learning model 510. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

Figure 5B:
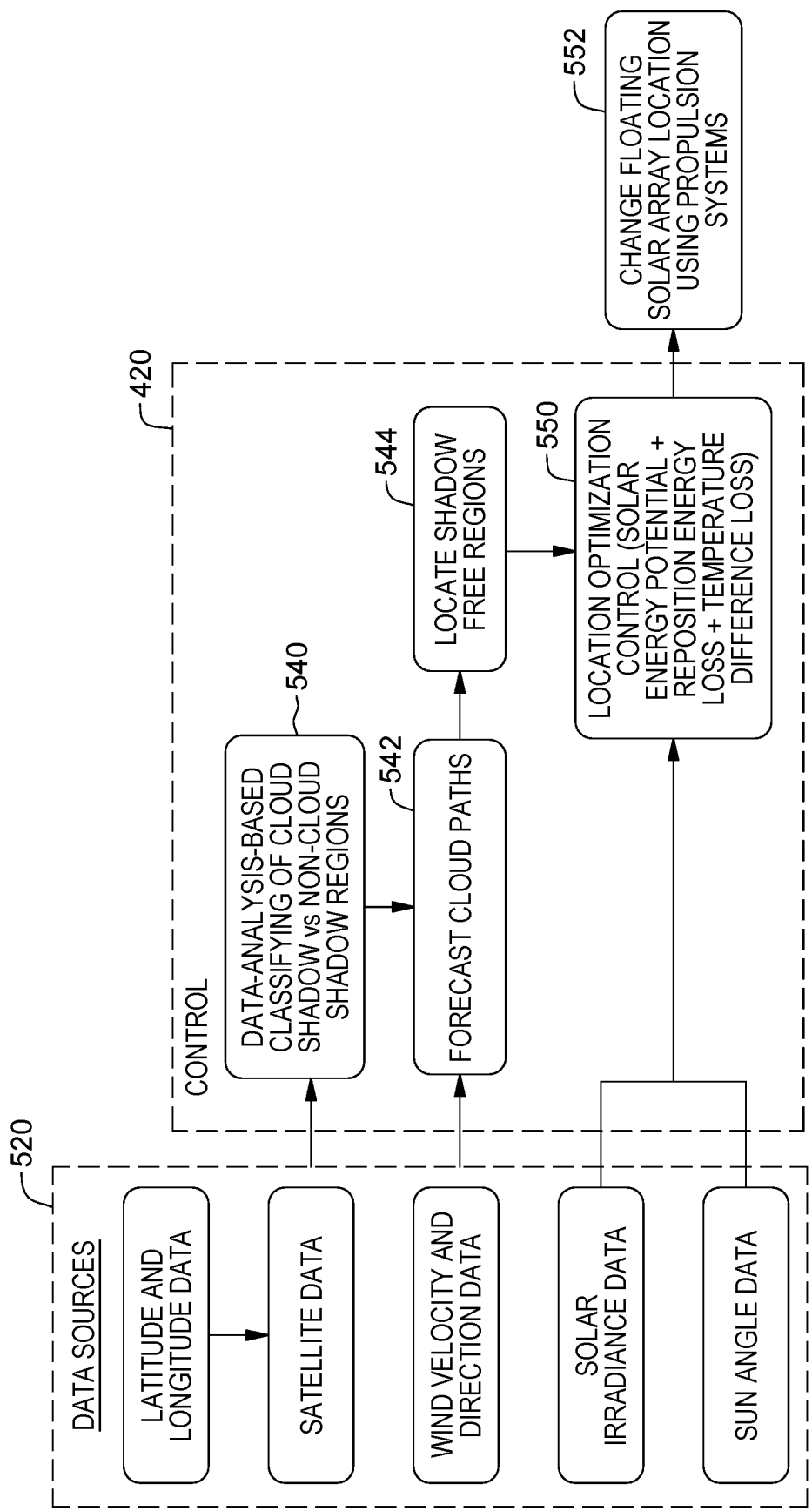
FIG. 5B depicts another embodiment of a data analysis-based floating solar array control workflow, in accordance with one or more aspects of the present invention.

By way of example, FIG. 5B depicts another embodiment of a data-analysis-based floating solar array control workflow, in accordance with one or more aspects of the present invention. In this embodiment, control 420 obtains (e.g., receives, retrieves, etc.) data from one or more data sources 520, including, for instance, latitudinal and longitudinal data on current location of the floating solar array, satellite imagery data providing information on clouds and/or cloud-shadowing within the geographical area, wind and velocity direction data to determine movement of cloud-shadows across the geographical area, solar irradiance data, sun angle data, as well as other data, such as propulsion system data, anchor system data, water temperature data, etc.

In one or more embodiments, control 420 includes program code which facilitates data-analysis-based classifying of cloud-shadow versus non-cloud-shadow regions of the geographical area 540, as well as forecasting cloud-shadow paths across the geographical area 542 to facilitate locating cloud-shadow-free regions 544 within the geographical area for a forecasted time period. Control 420 further includes, in one embodiment, a location optimization control facility, which weighs potential solar energy generation of the floating solar array in one or more regions of the plurality of regions of a geographical area versus energy loss in relocating the floating solar array to each of those regions, including anticipated propulsion system energy consumption, anchor system energy consumption, and/or water temperature differences resulting in solar efficiency loss between different regions of the geographical area 550. Depending on the results of the data analysis, control 420 can initiate, using the propulsion system, dynamic relocating of the floating solar array to an identified region of the geographical area which meets, for a forecasted time period, the predefined criteria for harvesting energy from the floating solar array. In one or more embodiments, the predefined criteria can include, for the forecasted time period, a greatest or optimum net energy harvesting potential for the floating solar array.

FIG. 6 depicts one example of a data-analysis-based control algorithm implemented by control 420 for identifying a region which meets, for a forecasted time period, a predefined criteria for harvesting energy from the floating solar array. As illustrated, the data-analysis-based control algorithm assumes, in one embodiment, a geographical area that has N grid regions, with an optimal region being selected such that a maximum energy harvest can be obtained from the floating solar panel for a forecasted time period. The data-analysis-based control algorithm maximizes the irradiance harvest by choosing the least-cloud-impacted, or higher irradiance spatial region, within the geographical area, while minimizing energy loss in transitioning the floating solar array from a current location to a different region of the geographical area.

Figure 7A:
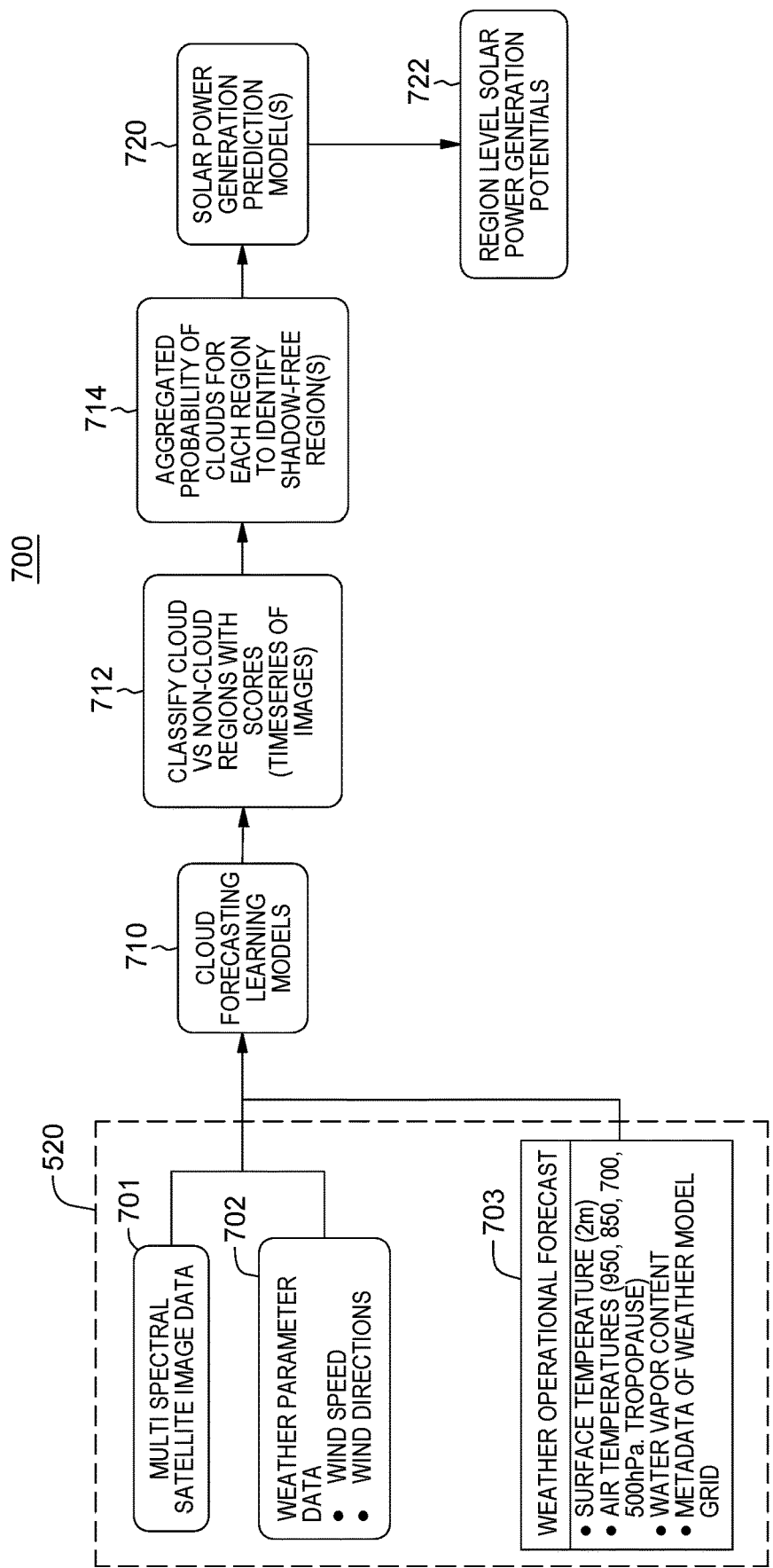
FIG. 7A depicts another workflow embodiment for identifying a region which meets, for a forecasted time period, a predefined criteria for harvesting energy from the floating solar array, in accordance with one or more aspects of the present invention.

FIG. 7A illustrates a further floating solar array control workflow 700, which can facilitate identifying a region which meets, for a forecasted time period, a predefined criteria for harvesting energy from the floating solar array. In workflow 700, multiple data sources 520 provide input to one or more trained cloud forecasting machine learning models 710. As illustrated, provided data can include multi-spectral satellite image data 701 of cloud cover relevant to a geographical area within which the floating solar array can be relocated, as well as weather parameter data 702, such as wind speed, wind direction, etc., and weather operational forecasts, such as water surface temperature, air temperature, water vapor content, and metadata of one or more available weather models 703. Output of cloud forecasting machine learning model 710 facilitates classifying cloud versus non-cloud regions of the geographical area using scores 712, and can include, in one embodiment, using a time-series of images. An aggregated probability of clouds for each region is determined 714 to, for instance, facilitate identifying one or more cloud-shadow-free regions within the geographical area. Note that as used herein, cloud-shadow-free regions can include any regions of the geographical area not forecasted to experience a cloud-shadow for the forecasted time period, and/or any region or regions within the geographical area which are forecasted to experience minimum cloud-shadowing for the forecasted time period. In the embodiment of FIG. 7A, one or more machine learning prediction models can be trained and used for predicting solar power generation of the floating array if positioned within the different regions, given the aggregated probability of clouds for the various regions, with, in one embodiment, region-level solar power generation potentials 722 being determined across the geographical area.

Figure 7B:
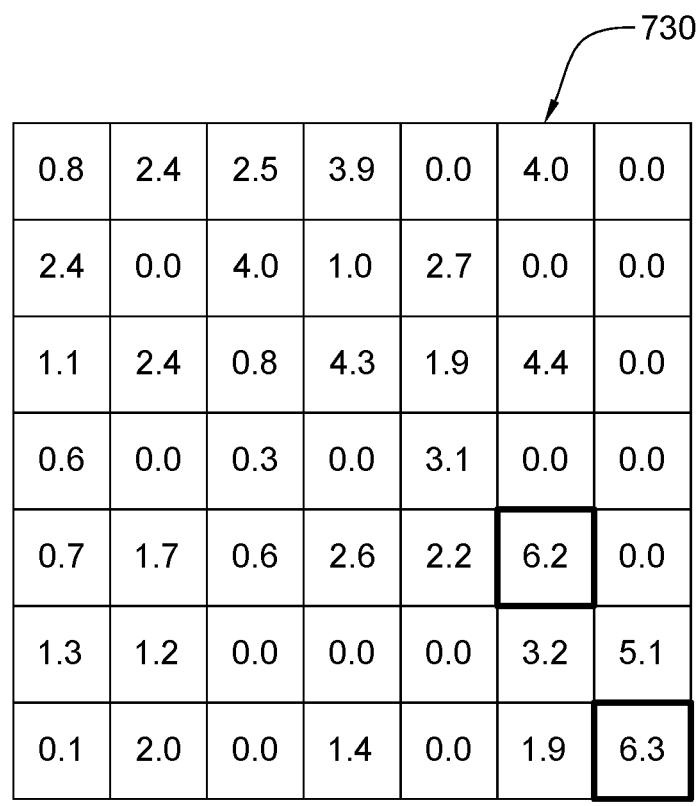
FIG. 7B is a representation of a plurality of regions of a geographical area with different predicted, region-level solar power generation capabilities for a forecasted time period, in accordance with one or more aspects of the present invention.

By way of example, FIG. 7B depicts a geographical area 730 in the form of a rectangular grid (as one example only), where each region has a respective solar power generation potential number associated therewith, which in one embodiment, can represent an increased percentage of net energy harvesting potential for the floating solar array over the forecasted time period, if the floating solar array is relocated to that region of the geographical area. Note that the geographical area configuration, number of regions within with the geographical area, and representative values for the region-level solar power generation potentials are provided by way of example only, and not limitation. Many variations are possible. Note also with respect to FIGS. 7A-7B, that with a collective series of cloud images, various forecasting models or techniques can be leveraged to predict the cloud-shadowing pattern for a forecasted time interval at a high spatial-temporal granularity. The forecasted images can then be aggregated to obtain an average probability of region-level clouds for each region of the geographical area.

In addition to predicting potential solar energy generation of the floating solar array in the different regions of the geographical area, the data-analysis-based control disclosed herein can further consider anticipated energy loss in relocating the floating solar array from a current region to another region of the plurality of regions of the geographical area in determining a net energy harvesting potential for selected regions of the geographical area over the forecasted time period. The predicted energy loss in relocating the floating solar array can include multiple loss components, including, for instance, predicted energy loss in moving the floating solar array, as well as potential floating solar array efficiency loss based on any water temperature change with relocating of the floating solar array to an identified region (that is, where a water temperature change could affect floating solar array efficiency).

Figure 8:
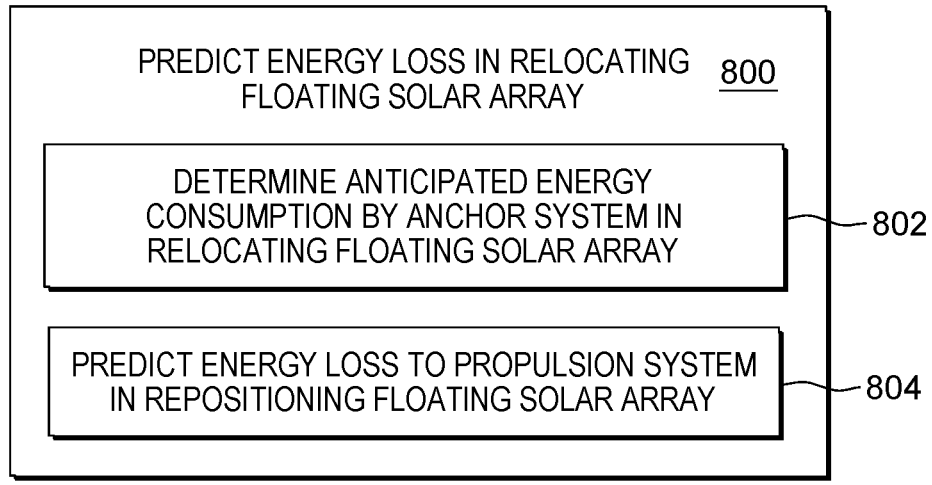
FIG. 8 depicts a further embodiment of a relocation-based, energy loss prediction workflow, in accordance with one or more aspects of the present invention.
Figure 9:
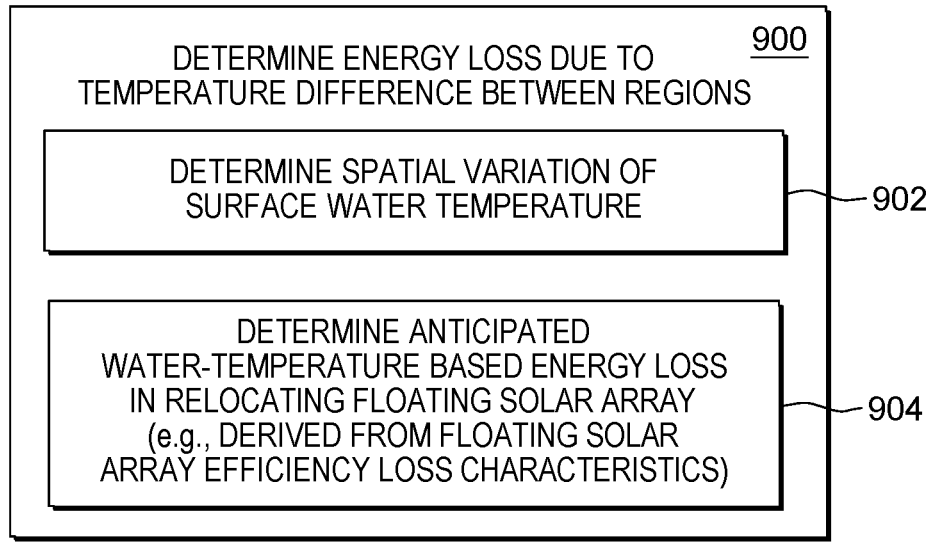
FIG. 9 depicts a further embodiment of another relocation-based, energy loss prediction workflow, in accordance with one or more aspects of the present invention.

By way of example, FIG. 8 depicts one embodiment of a relocation-based energy loss prediction workflow 800, in accordance with one or more aspects of the present invention. As illustrated, the workflow includes determining anticipated energy consumption by an anchor system associated with the floating solar array in relocating the floating solar array 802. For instance, energy consumed by the anchor system can include energy required to retrieve one or more anchors of the anchor system associated with the floating solar array, and potentially in releasing, or placing, the one or more anchors of the floating solar array at the identified region. For instance, for a 1.2 ton floating solar array, 7.5 kilograms of anchor may be required, with an average ocean depth of 3.7 kilometers. With such information, the amount of predicted energy to be expended can be determined.

In addition, the relocation-based energy loss prediction workflow can include predicting energy loss to the propulsion system in relocating the floating solar array 804. For instance, energy consumption characteristics of propulsion systems, including water jet propulsion systems, can be referenced. For a given speed, the energy consumed by the propulsion system for a given distance within the geographical area can be estimated based on the size and weight of the floating solar array and, for instance, currents or tides, depending on the water body at issue. For instance, relocating a floating solar array against a tide or current can result in higher power consumption, which the data-analysis-based control can account for in the machine learning prediction model(s) employed.

In another aspect, predicting energy loss in relocating the floating solar array to another region of the geographical area can incorporate predicting floating solar array efficiency loss based, for instance, on a water temperature change with relocating the floating solar array to the other region. In one embodiment, predicted energy loss due to temperature differences can be derived from floating solar array efficiency loss characteristics where, depending on the body of water, there can be a significant spatial variation in surface temperature within the geographical area. For instance, depending on the size of the geographical area, and particularly where the water is sea or ocean water, temperature can vary across the surface of the water. Therefore, in one or more embodiments, the data-analysis-based control can determine (as part of evaluating the different regions of the geographical area to identify a particular region which meets, for a forecasted time period, the predefined criteria for harvesting energy) energy loss due to temperature difference between a current region 900. Those skilled in the art will note that this assumes that the solar panel configurations of the floating solar array are such that water temperature can affect efficiency loss characteristics. The workflow can include determining spatial variation of surface water temperature 902, such as can be obtained from one or more available online data sources for a given time interval. Further, the workflow includes determining anticipated water temperature-based energy loss for the forecasted time period in relocating the floating solar array from a current location within the geographical area to another location 904, which as noted, can be derived from available water temperature-based floating solar array efficiency loss characteristics using the obtained surface water temperatures.

Those skilled in the art will note from the description provided herein that computer-implemented methods, computer systems and computer program products are provided for facilitating solar energy harvesting. The computer-implemented method includes, in one or more embodiments, providing data-analysis-based control of location of the floating solar array on water within a geographical area. The floating solar array has a propulsion system coupled thereto to facilitate relocating of the floating solar array. The control is configured to identify, using one or more machine learning prediction models, a region of a plurality of regions of the geographical area which meets, for a forecasted time period, a predefined criteria for harvesting energy from the floating solar array. In addition, the control is configured to initiate, using the propulsion system, dynamic relocating of the floating solar array to the identified region of the geographical area to facilitate solar energy harvesting from the floating solar array for the forecasted time period.

In one or more embodiments, the predefined criteria includes, for the forecasted time period, a greatest net energy harvesting potential for the floating solar array.

In one implementation, the control is further configured to identify the region with the greatest net energy harvesting potential for the forecasted time period by, at least in part, determining potential solar energy generation of the floating solar array if relocated to another region of the plurality of regions of the geographical area for the forecasted time period.

In one embodiment, the control is further configured to identify the region with greatest net energy harvesting potential for the forecasted time period by, at least in part, predicting energy loss in relocating the floating solar array to the other region of the plurality of regions, where net energy harvesting potential of the other region includes the determined potential solar energy generation of the floating solar array in the other region reduced by the predicted energy loss in relocating the floating solar array to the other region. In one embodiment, the predicted energy loss in relocating the floating solar array to the other region includes predicting energy to be consumed by the propulsion system of the floating solar array in relocating the floating solar array to the other region. Further, in one embodiment, predicting energy loss in relocating the floating solar array to the other region of the plurality of regions further includes predicting energy to be consumed by an anchor system of the floating solar array in relocating the floating solar array to the other region. In one or more other embodiments, predicting energy loss in relocating the floating solar array to the other region of the plurality of regions can include predicting floating solar array efficiency loss based on a water temperature change with relocating of the floating solar array to the other region.

In one or more implementations, the control is further configured to identify, based on data analysis, one or more predicted cloud-shadow-free regions of the plurality of regions of the geographical area for the forecasted time period, where the identified region is one predicted cloud-shadow-free region of the one or more predicted cloud-shadow-free regions of the plurality of regions of the geographical area.

In one embodiment, identifying the one or more predicted cloud-shadow-free regions for the forecasted time period includes data-analysis-based analyzing of one or more satellite images to identify cloud positions relative to the geographical area; data-analysis-based determining of cloud-shadow paths across the geographical area for the forecasted time period; and identifying the one or more predicted cloud-shadow-free regions of the geographical area for the forecasted time period based on the data-analysis-based analyzing of the one or more satellite images and the data-analysis-based determining of cloud-shadow paths across the geographical area.

Advantageously, by tracking cloud-shadow paths across the geographical area for a forecasted time interval, the floating solar array can be dynamically relocated to facilitate generating additional solar energy. Advantageously, computer-implemented methods, computer systems and computer program products are disclosed herein to facilitate relocating of a floating solar array based on forecasted cloud movements, and considering additional energy gain in automatically moving the floating solar array in comparison with predicted energy loss in moving the array. In one embodiment, a combination of satellite images and weather condition forecasts can be used to track cloud movements, and to spatially relocate a floating solar array to avoid or minimize cloud cover by utilizing a propulsion system associated with the floating solar array, and thereby maximize or enhance overall electricity generation of the floating solar array. In one implementation, an optimal spatial region within the geographical area for the floating solar array can be determined by determining current and future cloud positions within the geographical area for a forecasted time interval, and by determining trade-offs between the additional energy gain from solar generation in moving the array, versus energy loss in moving the floating solar array.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and Including), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating solar energy harvesting, the computer-implemented method comprising:
   providing data analysis-based control of location of a floating solar array on water within a geographical area, the floating solar array having a propulsion system coupled thereto to facilitate relocating of the floating solar array, the control being configured to:
   predictively identify, using one or more machine learning prediction models, a water region of a plurality of water regions of the geographical area which meets, for a forecasted time period, a predefined criteria for harvesting energy from the floating solar array; and
   initiate, using the propulsion system, dynamic relocating of the floating solar array to the identified water region of the geographical area to facilitate solar energy harvesting from the floating solar array for the forecasted time period.

2. The computer-implemented method of claim 1, wherein the control is further configured to predictively identify the water region with the optimal net energy harvesting potential for the forecasted time period by, at least in part, determining potential solar energy generation of the floating solar array if relocated to another water region of the plurality of water regions of the geographical area for the forecasted time period.

3. The computer-implemented method of claim 2, wherein the control is further configured to identify the water region with the optimal net energy harvesting potential for the forecasted time period by, at least in part, predicting energy loss in relocating the floating solar array to the other water region of the plurality of water regions, wherein net energy harvesting potential of the other water region includes the determined potential solar energy generation of the floating solar array in the other water region reduced by the predicted energy loss in relocating the floating solar array to the other water region.

4. The computer-implemented method of claim 3, wherein the predicting energy loss in relocating the floating solar array to the other water region of the plurality of water regions includes predicting energy to be consumed by the propulsion system of the floating solar array in relocating the floating solar array to the other water region.

5. The computer-implemented method of claim 4, wherein the predicting energy loss in relocating the floating solar array to the other water region of the plurality of water regions further includes predicting energy to be consumed by an anchor system of the floating solar array in relocating the floating solar array to the other water region.

6. The computer-implemented method of claim 3, wherein predicting energy loss in relocating the floating solar array to the other water region of the plurality of water regions comprises predicting floating solar array efficiency loss based on a water temperature change with relocating the floating solar array to the other water region.

7. The computer-implemented method of claim 1, wherein the control is further configured to identify, based on data analysis, one or more predicted cloud-shadow-free water regions of the plurality of water regions of the geographical area for the forecasted time period, the identified region being one predicted cloud-shadow-free water region of the one or more predicted cloud-shadow-free water regions of the plurality of water regions of the geographical area.

8. The computer-implemented method of claim 7, wherein identifying the one or more predicted cloud-shadow-free water regions for the forecasted time period includes:
   data-analysis-based analyzing of one or more satellite images to identify cloud positions relative to the geographical area;
   data-analysis-based determining of cloud-shadow paths across the geographical area for the forecasted time period; and
   identifying the one or more predicted cloud-shadow-free water regions of the geographical area for the forecasted time period based on the data-analysis-based analyzing of the one or more satellite images and the data-analysis-based determining of cloud-shadow paths across the geographical area.

9. A computer system for facilitating solar energy harvesting, the computer system comprising:
   a memory; and
   at least one processor in communication with the memory, wherein the computer system is configured to perform a method, the method comprising:
      providing data analysis-based control of location of a floating solar array on water within a geographical area, the floating solar array having a propulsion system coupled thereto to facilitate relocating of the floating solar array, the control being configured to:
         predictively identify, using one or more machine learning prediction models, a water region of a plurality of water regions of the geographical area which meets, for a forecasted time period, a predefined criteria for harvesting energy from the floating solar array, wherein the predefined criteria comprises, for the forecasted time period, an optimal net energy harvesting potential for the floating solar array; and
         initiate, using the propulsion system, dynamic relocating of the floating solar array to the identified water region of the geographical area to facilitate solar energy harvesting from the floating solar array for the forecasted time period.

10. The computer system of claim 9, wherein the control is further configured to predictively identify the water region with the optimal net energy harvesting potential for the forecasted time period by, at least in part, determining potential solar energy generation of the floating solar array if relocated to another water region of the plurality of water regions of the geographical area for the forecasted time period.

11. The computer system of claim 10, wherein the control is further configured to identify the water region with the optimal net energy harvesting potential for the forecasted time period by, at least in part, predicting anticipated energy loss in relocating the floating solar array to the other water region of the plurality of water regions, wherein net energy harvesting potential of the other water region includes the determined potential solar energy generation of the floating solar array in the other water region reduced by the predicted energy loss in relocating the floating solar array to the other water region.

12. The computer system of claim 11, wherein the predicting energy loss in relocating the floating solar array to the other water region of the plurality of regions includes predicting energy to be consumed by the propulsion system of the floating solar array in relocating the floating solar array to the other water region.

13. The computer system of claim 12, wherein the predicting energy loss in relocating the floating solar array to the other water region of the plurality of water regions further includes predicting energy to be consumed by an anchor system of the floating solar array in relocating the floating solar array to the other region.

14. The computer system of claim 11, wherein predicting energy loss in relocating the floating solar array to the other region of the plurality of water regions comprises predicting floating solar array efficiency loss based on a water temperature change with relocating the floating solar array to the other water region.

15. A computer program product for facilitating solar energy harvesting, the computer program product comprising:
   one or more computer-readable storage media and program instructions embodied therewith, the program instructions being readable by a processing circuit to cause the processing circuit to perform a method comprising:
      providing data analysis-based control of location of a floating solar array on water within a geographical area, the floating solar array having a propulsion system coupled thereto to facilitate relocating of the floating solar array, the control being configured to:
         predictively identify, using one or more machine learning prediction models, a water region of a plurality of water regions of the geographical area which meets, for a forecasted time period, a predefined criteria for harvesting energy from the floating solar array, wherein the predefined criteria comprises, for the forecasted time period, an optimal net energy harvesting potential for the floating solar array; and
         initiate, using the propulsion system, dynamic relocating of the floating solar array to the identified water region of the geographical area to facilitate solar energy harvesting from the floating solar array for the forecasted time period.

16. The computer program product of claim 15, wherein the control is further configured to predictively identify the water region with the optimal net energy harvesting potential for the forecasted time period by, at least in part, determining potential solar energy generation of the floating solar array if relocated to another water region of the plurality of water regions of the geographical area for the forecasted time period.

17. The computer program product of claim 16, wherein the control is further configured to identify the water region with the optimal net energy harvesting potential for the forecasted time period by, at least in part, predicting anticipated energy loss in relocating the floating solar array to the other water region of the plurality of water regions, wherein net energy harvesting potential of the other water region includes the determined potential solar energy generation of the floating solar array in the other water region reduced by the predicted energy loss in relocating the floating solar array to the other water region.

* * * * *